Aug. 22, 1950     W. TURNER ET AL     2,519,516
RECOVERY OF ESTROGENS FROM URINE
Filed March 29, 1947
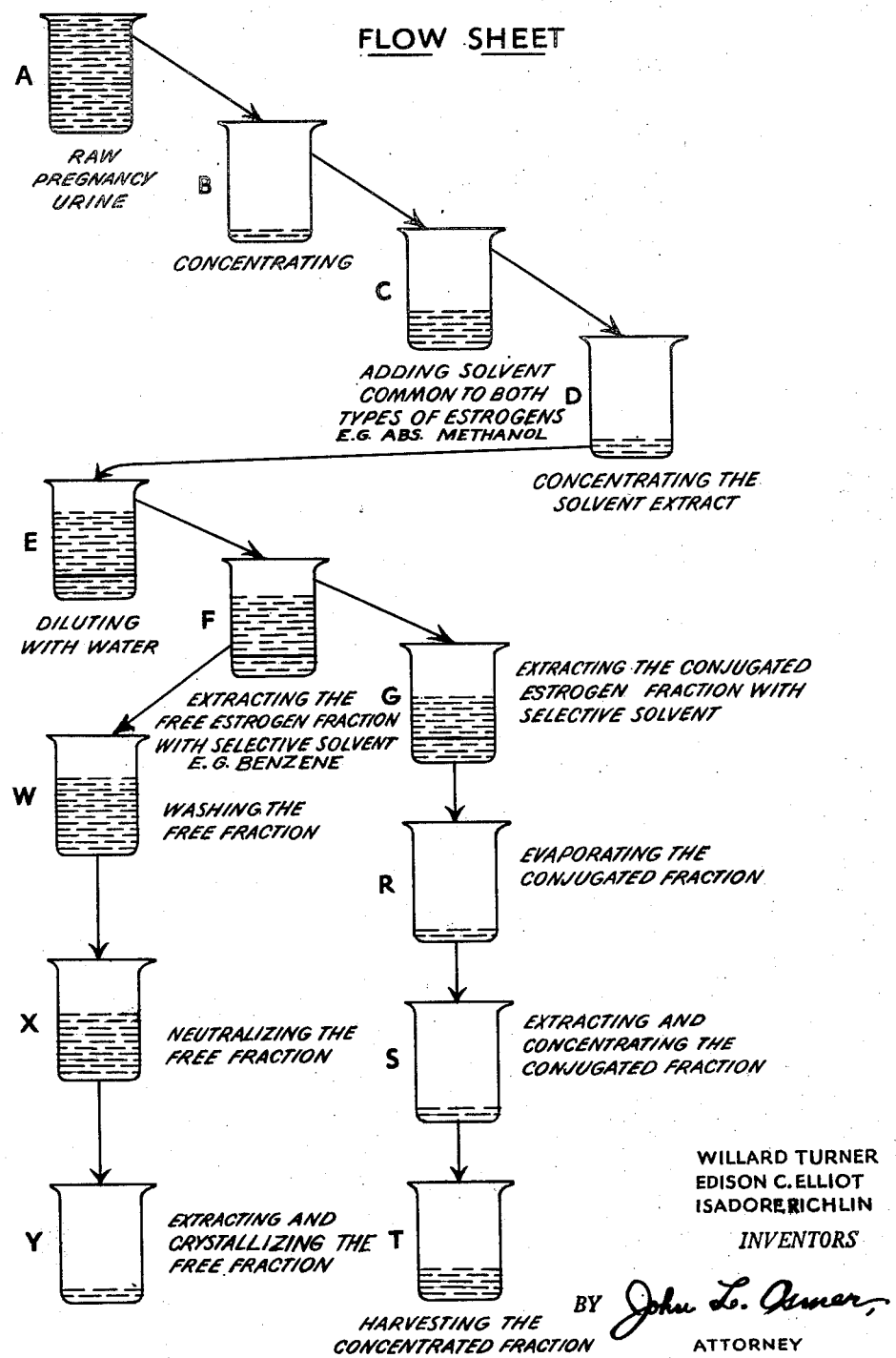
WILLARD TURNER
EDISON C. ELLIOT
ISADORE RICHLIN
    INVENTORS
BY *John L. Oumer*
    ATTORNEY Patented Aug. 22, 1950

2,519,516

UNITED STATES PATENT OFFICE 2,519,516

RECOVERY OF ESTROGENS FROM URINE

Willard Turner, Elgin, and Edison C. Elliott, Park Ridge, Ill., and Isadore Richlin, Alhambra, Calif., assignors, by mesne assignments, to The Borden Company, New York, N. Y., a corporation of New Jersey Application March 29, 1947, Serial No. 738,204

8 Claims. (Cl. 167—74.5)

This invention relates broadly to a process for obtaining estrogenic substances from natural material capable of being dried in whole or in part; and, in particular, to the obtainment of estrogenic substances from the urine of pregnant individuals.

It is known that large amounts of estrogens are secreted in the urine during pregnancy and that they are excreted substantially in the form of water-soluble conjugates. For example, in the case of pregnant women such estrogens are excreted principally in the form of glycuronates, while in the case of pregnant mares they are excreted primarily in the form of sulfates. The addition of free acid to the urine hydrolyzes the conjugated estrogens to free estrogen by removing the glycuronic or sulfate group from the molecule.

Hydrolyzed (or free) estrogens are not water-soluble to any great extent. They are, however, quite soluble in oil and oil solvents, and are thus defined as "oil-soluble" estrogens.

Various methods have been proposed for isolating estrogenic substances from the urine of individuals such as pregnant mares and pregnant women, and one customary practice has been to remove the hydrolyzed estrogen from the urine by filtration or extraction with an organic solvent such as butyl alcohol, benzene, chloroform, ether and the like, either by a batch method or by a continuous extraction method. Such methods, however, present difficulties in that equipment having large volumetric capacity is required because the amounts of urine so treated are large. Furthermore, during the filtration or extraction of the acidified urine, troublesome emulsions and colloidal precipitates are formed which slow down the efficiency of the extraction process.

Another method practiced heretofore has been to concentrate pregnancy urine to aprroximately one-tenth of its original volume at a low temperature and by the aid of a vacuum. This concentrated material is then acidified and extracted with a solvent which is immiscible with water. One of the difficulties of this method is that there is a large loss of estrogenic material, due to acidification of the urine. The estrogenic substances in pregnancy urine are sensitive to acids, and when a procedure is used which requires that the urine be made acid an appreciable amount of the desired hormone is destroyed. Water-soluble conjugated substances are not isolated by such methods since the conjugate is readily hydrolyzed in the presence of acid.

Other attempts have been made, however, to avoid the difficulties encountered when pregnancy urine is acidified. For example, a procedure has been used in which the pH is allowed to remain at or near neutrality and in which sufficient xylene is added to prevent hydrolysis of conjugated estrogens. The urine is concentrated and extracted with water-saturated butyl alcohol. The alcohol extract is washed and concentrated, then taken up in acetone, filtered, concentrated, and treated with an excess of ether to precipitate the conjugated material. However, the unconjugated estrogens present in pregnancy urine are not normally recovered by this process.

Another method of isolating estrogenic material from pregnancy urine which has been practiced consists of adding an adsorbent material to urine which adsorbs the estrogenic material. The urine is then filtered and the adsorbent material extracted with organic solvents. The difficulty with this method is that organic solvents do not completely extract estrogenic substances from the adsorbent material, which results in an inefficient recovery.

In another method enzymatic digestion has been employed to hydrolze the conjugated estrogen and to facilitate the extraction with an organic solvent of estrogenic substance from acidified pregnancy urine. This process, however, does not obviate the loss of estrogenic material due to hydrolysis and/or the troublesome emulsions formed during the extraction.

The principal object of this invention, therefore, was to derive and prepare water-soluble and oil-soluble forms of estrogenic materials from natural sources, and in a manner designed to overcome the problems and difficulties encountered in the prior art.

A further object of this invention was to prepare oil-soluble and water-soluble forms of estrogenic materials from the same batch of starting material.

Still another object of this invention was to recover estrogenic substances from pregnancy urine by an improved and highly efficient process.

A further object of this invention was to obtain estrogenic materials from pregnancy urine by a process in which the formation of troublesome emulsions during the extraction of such materials becomes minimized or eliminated.

Another object of this invention was to prepare water-soluble estrogens from urine which has aged and therefore has not been preserved to prevent hydrolysis of the conjugated estrogen to the free estrogen.

Other objects and a fuller understanding of the invention may be had by referring to the following description and claims.

It has now been discovered that the estrogenic substance present in a natural source in the form of water-soluble and oil-soluble materials may both be obtained from the same batch of source material by evaporating the starting material to substantial dryness, or to a volume small enough to permit economical extraction with a water-miscible solvent, and extracting the substantially dry material with a water-soluble or water-miscible solvent, or a mixture of solvents capable of dissolving both the water-soluble and oil-soluble estrogenic materials, followed by a dilution of the extract with water; thereafter extracting the water-insoluble material by means of a water-immiscible solvent, and subsequently extracting the water-soluble material by means of a solvent which is not water-miscible or water-soluble but which has a limited solubility in water and in which the water-soluble materials are soluble.

The water-soluble estrogenic materials present in a natural source material such as pregnancy urine comprise the conjugated estrogens, and in the case of urine from pregnant mares the estrogenic hormone is chemically combined with sulfuric acid and is present as the sodium salt. The oil-soluble material is present in the form of unconjugated estrogens. The unconjugated estrogen is water-insoluble but is soluble in organic solvents classed as water-soluble or water-miscible. The water-soluble or conjugated estrogens are soluble in water-soluble or water-miscible organic solvents, and thus when such a solvent is used on dried pregnancy urine both water-soluble and oil-soluble estrogens are extracted. By diluting this extract with water, the oil-soluble estrogens are rendered less soluble, such as in the case of aqueous dilute alcohol, or are thrown out of solution entirely and may then be separated by extracting with a water-insoluble organic solvent. The residual solution contains the water-soluble hormones in solution and by the proper choice of a solvent it may be removed by a second extraction. This second extraction may be facilitated by employing a salting-out process using a neutral inorganic salt, such for example as sodium chloride, sodium sulfate, and the like.

In the now preferred embodiment, the raw pregnancy urine is evaporated at a temperature of 40° C. or below by means of reduced pressure. The concentration may be brought to dryness or to a point where the concentrate is low enough in volume to permit economical extraction with a water-miscible solvent. By the addition of a filter-aid such as diatomaceous earth and subsequent treatment in a vacuum drier the material may be brought to complete dryness, or the concentrated material may be used as such, providing the residual water present can be removed by the first solvent extraction with a water-soluble or water-miscible solvent. The water-soluble or water-miscible solvents which may be employed at this stage for the extraction of the dry or substantially dry material are, for example, the lower alcohols, glycols, aldehydes, ketones, organic acids, and organic acid esters. Other similar oxygen-rich solvents may be employed as solvents for both water-soluble and oil-soluble estrogenic material. The simpler alicyclic and heterocyclic organic bases, such as pyridine and the like, may also be employed for this extraction.

The first extract containing both water-soluble and oil-soluble estrogenic materials is next diluted with water to such extent that the oil-soluble estrogens are rendered less soluble and are thrown out or come out of solution. The oil-soluble estrogens may then be isolated by extraction with a water-insoluble and water-immiscible solvent as, for example, ether, benzene, ethylene dichloride, and the like. This solution which contains only the oil-soluble estrogenic material may then be evaporated and the resulting material purified by conventional methods.

The aqueous solution, containing the water-soluble conjugated estrogenic material, is next extracted with a solvent having a limited solubility in water, such for example as butanol, butyl acetate, and the like, and the conjugated estrogens recovered therein. Upon evaporation of the solvent the conjugated estrogens are obtained as a reddish-brown resin which in itself has valuable uses; or this resin may be hydrolyzed to produce unconjugated estrogenic material. The water-soluble resin may be subjected to purification by conventional methods.

Referring to the drawing, there is illustrated a flow sheet for the now preferred process for carrying out the series of sequential steps of the invention. The raw pregnancy urine is first gathered (step "A"), and then concentrated by evaporating to dryness or near dryness (step "B"). The concentrated material containing both the free estrogens and the conjugated estrogens present in the starting material is then treated with a water-soluble or water-miscible organic solvent, which is a solvent for both the free and the conjugated estrogens (step "C"). The solvent extract is then concentrated (step "D"). The concentrated extract is then diluted with water and then preferably saturated with a neutral salt (step "E"). The aqueous solution containing the water-miscible or water-soluble solvent is next extracted with an organic solvent, which is a non-solvent for the conjugated estrogens, but which is a solvent for the free estrogenic material (step "F"). The solvent containing the free estrogenic material and in which there is substantially no conjugated estrogenic material is washed (step "W"); then neutralized and salted out (step "X"). Finally, the estrogen is extracted with a water-insoluble solvent, such as toluene, and concentrated to approximately one-tenth its volume, whereupon crystals of the free estrogen will form (step "Y").

The fraction containing the conjugated estrogenic material in step "F" is then extracted with a solvent, which is a solvent for the conjugated estrogen which has a limited solubility in water (step "G"). The solvent containing the conjugated estrogenic material is then washed with dilute aqueous alkali, the water removed and the solvent extract then evaporated substantially to dryness (step "R"). The dry material is then extracted with an organic solvent, such as acetone, which is a solvent for the conjugated estrogenic material and then concentrated (step "S"). The estrogenic material is then diluted with a second solvent, such as anhydrous ether, and the conjugated estrogenic material then precipitated from the ether solution and from the mother liquor of acetone and ether and finally harvested as a reddish brown precipitate (step "T").

The following examples are given by way of illustration and are not to be construed as limiting the invention:

Example I

A concentrate prepared from 35 gallons of raw pregnant mares' urine was mixed with diatomaceous earth and dried in a vacuum shelf-drier. The dried powder was extracted with absolute methanol and the extract was concentrated and diluted with 2 volumes of water, followed by saturation of the aqueous solution with sodium chloride. The aqueous-methanolic solution was extracted thoroughly with benzene and then with butanol. The benzene extract, which contained the water-insoluble unconjugated estrogenic material, was washed with 5 per cent solution of sodium carbonate and extracted into normal sodium hydroxide. The sodium hydroxide solution was neutralized to 0.1 normality by the addition of hydrochloric acid, and sodium chloride was added until the solution was almost saturated. The estrogenic materials were then extracted into toluene and the toluene solution was washed with distilled water and concentrated under reduced pressure. Estrogen crystallized from the toluene after standing for a few days in a cool place. The benzene extract containing the estrogen gave an assay value of 1.2 grams free estrogen.

The butanol extract containing conjugated water-soluble estrogens was purified by washing with 0.1 normal sodium hydroxide, followed by washing with water, and was then concentrated to dryness. The dried residue was dissolved in acetone, concentrated to a small volume, and diluted with 3 volumes of anhydrous ether. A water-soluble reddish-brown resin was precipitated from the ether solution and the resin contained 1.45 grams conjugated estrogen; the mother liquor of acetone and ether contained 2.17 grams of estrogen.

Example II

Substantially the same technique was used as described above, except that instead of drying the urine it was concentrated to one-tenth of its original volume, extracted with methanol so that the resulting extract contained 20% water, the insoluble materials filtered and discarded, and the filtrate diluted with two volumes of water and purified as above. A solution of 50% methanol and 50% water will extract simultaneously both the free and conjugated forms of estrogen. However, the extraction process is more efficient when the water content of the methanol is held below 20%.

These same techniques may be used to derive and prepare free and conjugated estrogens from feces of pregnant animals, placentae, and any other natural materials containing estrogens. Other free and conjugated sterols of various descriptions may be purified and separated in the same manner.

While the invention has been described in detail according to the preferred manner of carrying out the process, it will be obvious to those skilled in the art that changes and modifications may be made without departing from the spirit or scope of the invention, and it is intended to cover all such changes and modifications in the appended claims.

What is claimed is:

1. In a process for obtaining estrogenic substances from pregnancy urine, the steps which comprise concentrating the urine by evaporating it to substantial dryness, extracting the concentrated material with a water-miscible organic solvent, which solvent is a solvent for both the water-insoluble and the water-soluble estrogenic substances, diluting the solvent extract thus obtained with sufficient water to insolubilize and throw out water-insoluble substances, extracting the aqueous solution with an organic water-immiscible solvent, which solvent is a solvent for the water-insoluble estrogenic substances, and recovering said water-insoluble estrogenic substances contained in said solvent, then extracting said aqueous solution with a solvent having only slight solubility in water, which solvent is a solvent for the water-soluble estrogenic substances, and recovering the water-soluble estrogenic substances contained in said solvent.

2. In a process for obtaining estrogenic substances from pregnancy urine, the steps which comprise concentrating the urine by evaporating it to approximately one-tenth of its original volume, extracting the concentrated material with a water-miscible organic solvent, which solvent is a solvent for both the water-insoluble and the water-soluble estrogenic substances, diluting the solvent extract thus obtained with sufficient water to insolubilize and throw out water-insoluble substances, extracting the aqueous solution with an organic water-immiscible solvent, which solvent is a solvent for the water-insoluble estrogenic substances, and recovering said water-insoluble estrogenic substances contained in said solvent, then extracting said aqueous solution with a solvent having only slight solubility in water, which solvent is a solvent for the water-soluble estrogenic substances, and recovering the water-soluble estrogenic substances contained in said solvent.

3. In a process for obtaining estrogenic substances from pregnancy urine, the steps which comprise concentrating the urine by evaporating it to substantial dryness, extracting the concentrated material with a water-miscible organic solvent, which solvent is a solvent for both the water-insoluble and the water-soluble estrogenic substances, diluting the solvent extract thus obtained with sufficient water to insolubilize and throw out water-insoluble substances, saturating the dilute extract with an aqueous solution of a neutral inorganic salt, extracting the aqueous solution with an organic water-immiscible solvent, which solvent is a solvent for the water-insoluble estrogenic substances, and recovering said water-insoluble estrogenic substances contained in said solvent, then extracting said aqueous solution with a solvent having only slight solubility in water, which solvent is a solvent for the water-soluble estrogenic substances, and recovering the water-soluble estrogenic substances contained in said solvent.

4. In a process of obtaining estrogenic substances from pregnancy urine, the steps which comprise evaporating the urine to substantial dryness, extracting the substantially dry material with absolute methanol, diluting the methanol extract with sufficient water to insolubilize water-insoluble substances, extracting the diluted solution with benzene to separate water-insoluble estrogenic substances from the aqueous solution, and extracting the aqueous solution with butanol to separate water-insoluble conjugated estrogenic substances from the aqueous solution.

5. In a process of obtaining estrogenic substances from pregnancy urine, the steps which comprise evaporating the urine to substantial dryness, mixing the substantially dry material with a filter-aid, extracting the substantially dry material with absolute methanol, diluting the methanol extract with sufficient water to insolubilize water-insoluble substances, extracting the diluted solution with benzene to separate water-insoluble estrogenic substances from the aqueous solution, and extracting the aqueous solution with butanol to separate water-soluble conjugated estrogenic substances from the aqueous solution.

6. In a process of obtaining estrogenic substances from the urine of pregnant mares, the steps which comprise evaporating the urine to substantial dryness, mixing the substantially dry material with a filter-aid, extracting the substantially dry material with absolute methanol, diluting the methanol extract with sufficient water to insolubilize water-insoluble substances, extracting the diluted solution with benzene to separate water-insoluble estrogenic substances from the aqueous solution, and extracting the aqueous solution with butanol to separate water-soluble conjugated estrogenic substances from the aqueous solution.

7. In a process of obtaining estrogenic substances from pregnancy urine, the steps which comprise evaporating the urine to substantial dryness, extracting the substantially dry material with pyridine, diluting the pyridine extract with sufficient water to insolubilize water-insoluble substances, extracting the diluted solution with ethylene dichloride to separate water-insoluble estrogenic substances from the aqueous solution and extracting the aqueous solution with butanol to separate water-soluble conjugated estrogenic substances from the aqueous solution.

8. In a process of obtaining estrogenic substances from the urine of pregnant mares, the steps which comprise evaporating the urine to substantial dryness, mixing the substantially dry material with diatomaceous earth, extracting with absolute methanol, diluting the extract with water, saturating the diluted extract with sodium chloride, extracting the saturated solution with benzene to separate water-insoluble estrogenic substances, and extracting the saturated solution with butanol to separate water-soluble conjugated estrogenic substances.

WILLARD TURNER.
EDISON C. ELLIOTT.
ISADORE RICHLIN.

REFERENCES CITED

The following references are of record in the file of this patent:

UNITED STATES PATENTS

| Number | Name | Date |
| --- | --- | --- |
| 1,969,608 | Haussler | Aug. 7, 1934 |
| 2,429,398 | Cook | Oct. 21, 1947 |

FOREIGN PATENTS

| Number | Country | Date |
| --- | --- | --- |
| 72,614 | Sweden | Sept. 8, 1931 |

OTHER REFERENCES

McCullagh, in J. Biol. Chem. 126, pages 299–303 (1938).

Certificate of Correction

Patent No. 2,519,516 August 22, 1950

WILLARD TURNER ET AL.

It is hereby certified that error appears in the printed specification of the above numbered patent requiring correction as follows:

Column 6, line 70, for the word "water-insoluble" read *water-soluble*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*